United States Patent [19]
Li et al.

[11] Patent Number: 6,119,162
[45] Date of Patent: Sep. 12, 2000

[54] METHODS AND APPARATUS FOR DYNAMIC INTERNET SERVER SELECTION

[75] Inventors: Chuang Li, Saratoga; Alex Weihwang Jeng, San Jose; Victor Maravillas, San Francisco; Chee Hin Ho, San Jose, all of Calif.

[73] Assignee: Actiontec Electronics, Inc., Sunnyvale, Calif.

[21] Appl. No.: 09/161,609

[22] Filed: Sep. 25, 1998

[51] Int. Cl.[7] ................................................ G06F 15/16
[52] U.S. Cl. .......................... 709/227; 709/220; 709/221; 709/249
[58] Field of Search ..................................... 709/220, 249, 709/250, 238, 227, 221, 228; 714/4

[56] References Cited

U.S. PATENT DOCUMENTS

| | | | |
|---|---|---|---|
| 5,784,555 | 7/1998 | Stone | 709/220 |
| 5,835,481 | 11/1998 | Akyol et al. | 370/216 |
| 5,852,722 | 12/1998 | Hamilton | 709/221 |
| 5,862,348 | 1/1999 | Pedersen | 709/229 |
| 5,915,217 | 6/1999 | Wiedeman et al. | 455/427 |

OTHER PUBLICATIONS

Srisuresh et al, "Load Sharing using IP Networking Address Translator" Network Working Group, RFC 2391, pp 1–18, Aug. 1998.

*Primary Examiner*—Mehmet B. Geckil
*Attorney, Agent, or Firm*—Fish & Neave; Nicola A. Pisano; Christopher J. Frerking

[57] ABSTRACT

Methods and apparatus for dynamically selecting a computer on a local area network to become a server providing shared access to a wide area network, such as the Internet, to all of the computers on the local area network is disclosed. A server may be selected from among any of the computers on the local area network that is currently available (i.e. powered on), and capable of establishing a connection to the wide area network. If the current server shuts down, a new server may be selected and started with only minimal impact on the other computers on the local area network, which are automatically reconfigured to use the new server to route network traffic to the wide area network.

39 Claims, 3 Drawing Sheets

METHODS AND APPARATUS FOR DYNAMIC INTERNET SERVER SELECTION

FIELD OF THE INVENTION

The present invention relates generally to computer networking, and to establishing a connection to a wide area network, such as the Internet, that is shared by a small number of computers in a home environment.

BACKGROUND OF THE INVENTION

The explosive growth of the Internet that has occurred over the past few years has made the Internet and the World Wide Web (WWW) an increasingly important means for communication and distribution of information. Although much of the growth of the Internet has occurred due to its uses in education, research, and business, many households are now purchasing computer equipment and establishing Internet connections. As increasing numbers of households and families gain access to the Internet, numerous services, such as entertainment and shopping, are becoming available to serve the needs of these users. Home users are already becoming the predominant population of Internet users, and will further increase in numbers as the services available to home users become more numerous and attractive.

At the same time that increasing numbers of home users are gaining access to the internet, the price of computer equipment is rapidly decreasing. During the past year, personal computer systems priced at under $1000 were the fastest growing segment of the personal computer market. Almost all of these inexpensive computers come with a pre-installed high-speed modem and software for connecting to the Internet. With the availability of such inexpensive computers, it is not uncommon for households to have multiple computer systems, each capable of establishing a connection to the Internet.

The equipment necessary to connect multiple computer systems together to form a local area network (LAN) has also become inexpensive and simple. Many home computers are now equipped by the manufacturer with a standard network interface. Low cost add-on network interface cards and network hubs are also readily available. Setting up a LAN in the home is an attractive option for households having multiple computer systems, as it permits many resources, such as printers or storage space to be shared between all of the computers on the LAN. Moreover, manufacturers of other types of home equipment, such as home security systems, home control systems, audio and video equipment, and appliances are starting to incorporate network interfaces into their products. Already, many new homes are being built with the wiring for a LAN built-in, and it is expected that over the next decade, many more households will install a LAN.

Additionally, with the potential growth of home LANs, numerous networking technologies have been developed to make it easier to install a LAN in a home environment. These include technologies that can connect a LAN through preexisting wiring in a home, for example, by sending LAN traffic across power lines or home telephone lines. Also, numerous wireless LAN technologies that may be appropriate for home use have been developed, such as infrared and low-power RF LANs. As this type of equipment becomes widely available at a relatively low cost, it is expected that household LANs will become commonplace.

Gaining access to the Internet through a single computer is relatively simple. A large number of Internet service providers (ISPs) provide dial-up accounts that permit virtually unlimited low-speed access to the Internet for a modest monthly fee. All that is typically needed to connect to the Internet through an ISP is a personal computer equipped with a modem, a telephone line, and software (that typically is pre-installed on the computer system) for accessing the Internet through the ISP.

The speed of the modem typically determines the speed of the connection to the Internet, and is currently less than 56,000 bits per second. Over the next few years, various types of higher speed connections, such as cable modems or digital subscriber lines, capable of transferring more than a million bits per second, are expected to become widely available for home use at a relatively low cost.

In the past, dial-up connections typically provided access to the Internet to only a single computer at a time. Connecting multiple computers to the Internet required multiple telephone lines, and multiple ISP accounts. The monthly costs of maintaining multiple telephone lines and ISP accounts made this option prohibitively expensive for most households. As a result, even if a household had multiple computers, each with a high-speed modem, only one of these would typically be connected to the Internet through an ISP at any given time.

Recently, it has become possible to share a single dial-up connection to the Internet with all the computers connected to a LAN by using "gateway software." The two widely available types of gateway software are called "proxy server" software, and "network address translation" software. Proxy server software works by providing an intermediary network server between the Internet and the LAN. Computers on the LAN are configured to send their requests to the proxy server software running on one particular computer on the network. The proxy server software then sends the request to the appropriate place on the Internet, receives any response, and sends the response back to the appropriate computer on the LAN. Thus, the proxy server interposes itself in every communication between a computer on the LAN and the Internet.

Network address translation software works in a manner similar to proxy server software, but is somewhat more transparent to the other computers on the LAN. Network traffic addressed to computers outside of the LAN is directed to the network address translation software, which reroutes the network traffic to the Internet. The addresses of network traffic received from the Internet in response to requests made by computers on the LAN are translated to reroute the traffic to the appropriate computers on the LAN.

Both proxy server software and network address translation software are commercially available from numerous vendors, and may be run on a wide variety of platforms. One popular proxy server software package for use with Microsoft's WINDOWS 95 operating system is WINGATE, produced by Deerfield.com, of Gaylord, Mich. A popular network address translation software package for use with Microsoft's WINDOWS 95 operating system is SYGATE, produced by SyberGen Incorporated, of Fremont, Cali.

Using such software, one of the computers on the network (hereinafter referred to as the "server") establishes a connection to the Internet (e.g. using a modem and ISP), and permits the other computers on the LAN to access the Internet through the server. Typically, only one of the machines on the LAN is designated as the server, and only the server may normally establish a connection to the Internet.

One drawback of this arrangement is that the software typically requires that one of the computers be designated as a server, and the server may not be easily changed once designated. Since all of the computers on the LAN rely on the server for their internet connection, if the server is down (e.g. powered off or temporarily disconnected from the LAN), none of the computers on the LAN are able to access the Internet. Similarly, if the server stops functioning (e.g. due to a software problem or a system crash) while other computers on the LAN are using the server to access the Internet, all of the Internet connections are immediately lost.

These difficulties are easily overcome in a small business environment, where it is common to dedicate a specific computer to performing the tasks of a server. The server is typically not used for any other functions (aside from sharing of other network resources), and runs continuously. The server is also typically configured with a professional, stable operating system, and may be configured to run only a small set of carefully selected software packages that are known to be stable, and are unlikely to encounter incompatibilities or to cause system crashes. It is also not uncommon for small businesses to hire a computer professional to make certain that their server is properly configured, and continues to function.

Conditions typically are very different in a home environment. For example, even if the household owns several computers, rarely is one of them dedicated to being a server. The computers used in the home are often turned off during non-use, so there is no guarantee that any particular computer will be powered on and thus available for use as a server. Additionally, many home users run somewhat unstable consumer-level operating systems on their computers, and also may run a wide variety of software, increasing the probability of incompatibilities, system crashes, and other software-related problems. It is difficult to use typical gateway software in such an environment, since no one computer on the LAN can be reliably designated as the server.

In view of the above, it would be desirable to provide a means for dynamically selecting which of a number of available computers on a LAN should be used as a server to provide LAN access to the Internet.

It would also be desirable to provide a means for dynamically and transparently switching between servers when the computer that is currently acting as server is shut down.

SUMMARY OF THE INVENTION

It is an object of the present invention to provide a means for dynamically selecting which of a number of available computers on a LAN should be used as a server to provide LAN access to the Internet.

It is also an object of the invention to provide a means for dynamically and transparently switching between servers when the computer that is currently acting as server is shut down.

These and other objects of the present invention are achieved by providing "server selection agent" software that works with gateway software to dynamically select and switch between servers. The software is designed to reduce the difficulties encountered when running a server in a home environment by permitting any one of a number of modem-equipped computers on a LAN (i.e. most home computers) to become a server.

The software first searches the LAN to see if there is already an active server. If no server is found, then the software selects which of the available computers on the LAN should become the server. Once the selection is made, the computer that was selected as the server starts the gateway software, and the other computers route their Internet traffic through the selected server. When the selected server shuts down, the computers on the LAN choose a new server from among the available computers, and resynchronize their network traffic to use the new server.

Except in certain special override conditions, this entire process may be accomplished in a manner that is transparent to the users of the computers. Users of the computers on the LAN simply run their Internet-capable software as if they had a permanent connection to the Internet. The server selection agent software and gateway software run in the background, and automatically handle all of the details of selecting a server, connecting to an ISP to gain access to the Internet, routing network traffic between the LAN and the Internet, and dynamically switching between servers.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
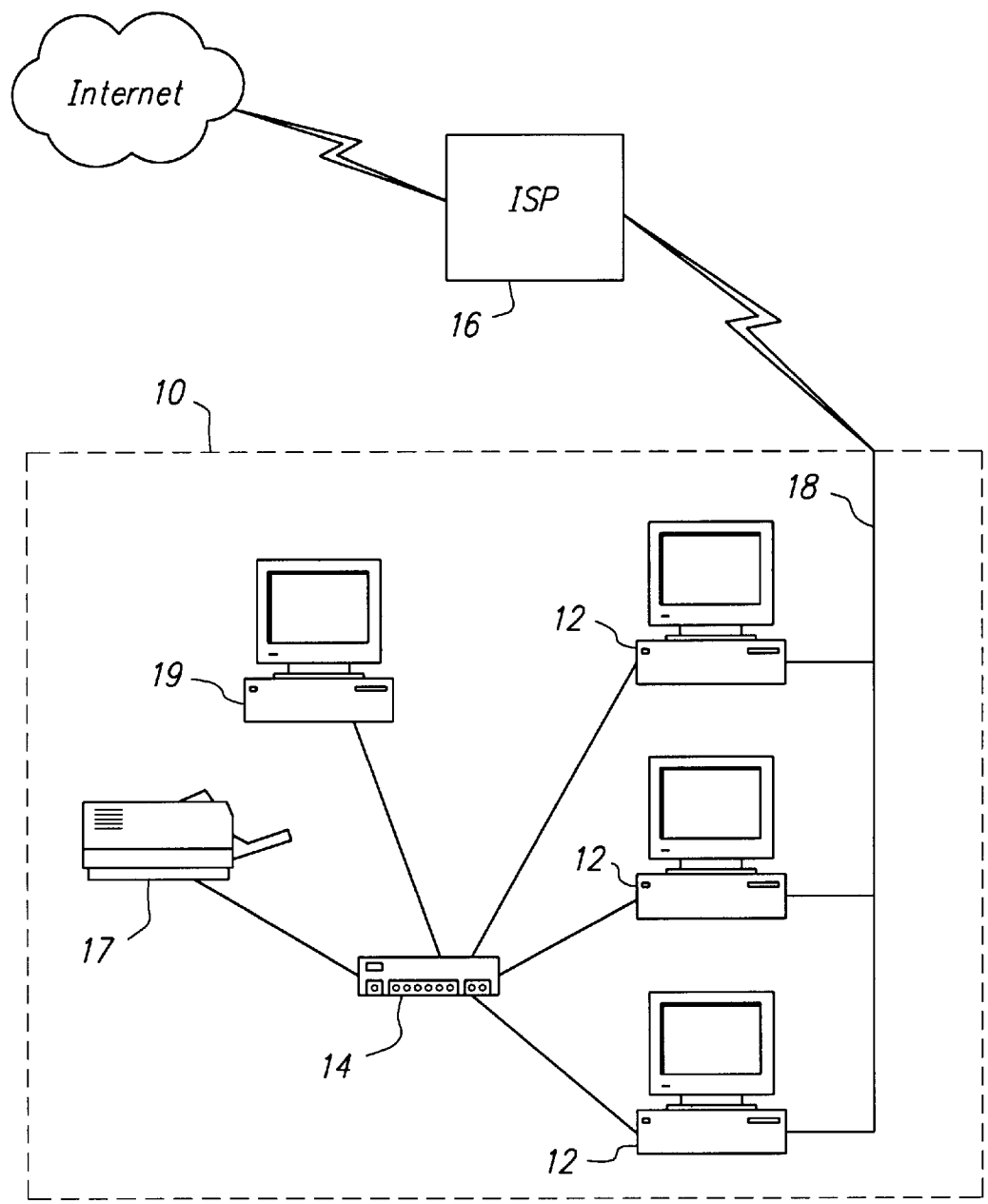
FIG. 1 shows a LAN on which the methods of the current invention may be used.

Referring to FIG. 1, typical home or small office LAN 10 is described. Each of computers 12 on LAN 10 includes a network interface card and a modem. Computers 12 are coupled to LAN 10 through their network interface cards, and through network hub 14, which interconnects all of the devices on LAN 10.

Each of computers 12 has an associated modem (e.g. an internal modem) or other communications device through which the computer can connect to a wide area network. For purposes of this application a wide area network (WAN) comprises any network or communications system outside of the LAN. It also will be evident to one skilled in the art that a connection to a wide area network may be established either directly, or through an intermediary network (LAN or WAN).

Typically, computers 12 will establish a connection to the Internet (or other WAN) by connecting to ISP 16 through public telephone line 18. Because LAN 10 is being used in a home or small office, all of computers 12 share a single public telephone line 18, so only one of computers 12 may use its modem to connect to ISP 16 (or any other service) at any given time. Other network capable devices, such as printer 17 may also be connected to LAN 10. Additionally, computers without modems, such as computer 19, may be connected to LAN 10. Such computers may not be connected to public telephone line 18, and may not establish a connection to ISP 16.

In a typical previously known LAN, only one of computers 12 on LAN 10 could be connected to the Internet through ISP 16 at any given time. Whichever one of computers 12 was connected would block any of the other computers on the LAN from using public telephone line 18 and the Internet account on ISP 16. The development of gateway software, however, such as network address translation software or proxy server software, permits all of the computers on LAN 10 to share public telephone line 18 and access to ISP 16. The gateway software usually is installed on one of computers 12, which then functions as a designated server. All of the other computers 12 and computer 19 are configured to route any traffic to the Internet through the designated server containing the gateway software. Only the designated server normally uses its modem to connect to ISP 16, and if the server is shut down or disconnected from LAN 10, all of the other computers and devices on LAN 10 become unable to access the Internet.

In accordance with the principles of the present invention, server selection agent software is provided that enables any of computers 12 to be dynamically selected as the server. The server selection agent software of the present invention may be included as part of an operating system, or may be a separate software application. In either case, the server selection agent software is installed on all of computers 12 and on computer 19. Additionally, gateway software is installed on all of computers 12, since any of computers 12 could potentially become the server.

When any of computers 12 or computer 19 needs access to the Internet, a server is selected from among the available computers 12. Computer 19 cannot be selected as a server, because it does not have a modem, and cannot establish a connection to ISP 16.

If the server is shut down or disconnected from the network, the other computers select a new server from the available computers 12, and reestablish their connections to the Internet through the new computer 12 selected to function as the server. In a preferred embodiment, the server may also be changed if a new one of computers 12 becomes available that would be a better server (e.g. because it has a faster modem) than the current server. Only if none of computers 12 are available, such as if they are all powered off, would other computers (e.g. computer 19) or devices on LAN 10 be unable to access the Internet.

A preferred embodiment of the server selection agent software of the present invention also permits the user of one of the computers to request that his or her computer become the server. This may be useful, for example, if the user wishes to connect to a different ISP than the one that is currently in use by the server. If this "Override" mode is used, a message is displayed on each of the active computers on LAN 10, asking permission to switch servers. If all the users of the active computers on LAN 10 consent by selecting an "OK" option in the message, the server is switched, and all of the computers on LAN 10 reroute their Internet traffic through the new server (i.e. they become "clients" of the new server).

It will be apparent to one skilled in the relevant arts that the modems in computers 12 may be replaced with cable modems, ISDN modems, or digital subscriber line modems, and public telephone line 18 may be replaced with other communications technology, such as a cable line, an ISDN line, or a digital subscriber lines. It will also be apparent that computers 12 may not all be identical. Some of computers 12 may be faster than others, or have faster modems. Some of computers 12 may be connected to ISP 16 through, for example, a cable line, while others of computers 12 are connected to ISP 16 through public telephone line 18.

Other configurations having multiple public telephone lines (or other communications lines) may also be used. With multiple telephone lines, it is possible to have more than one active server, and each of the client computers may select one of the active servers to reroute its Internet traffic. Alternatively, each of the computers may connect to more than one active server, to provide additional network bandwidth.

Additionally, the "hub and spoke" configuration of LAN 10 is for illustration only. Other network configurations also are possible, and may not require use of network hub 14. Additionally, although LAN 10 typically comprises standard 10Base-T or 100Base-T connections, it could also comprise connections made via power lines, telephone lines, wireless connections made via infrared or RF transmission, or any other type of network connection. The principles of the present invention may be applied equally to any of these configurations, and should not be seen as limited to the configuration of LAN 10 shown in FIG. 1.

Figure 2:
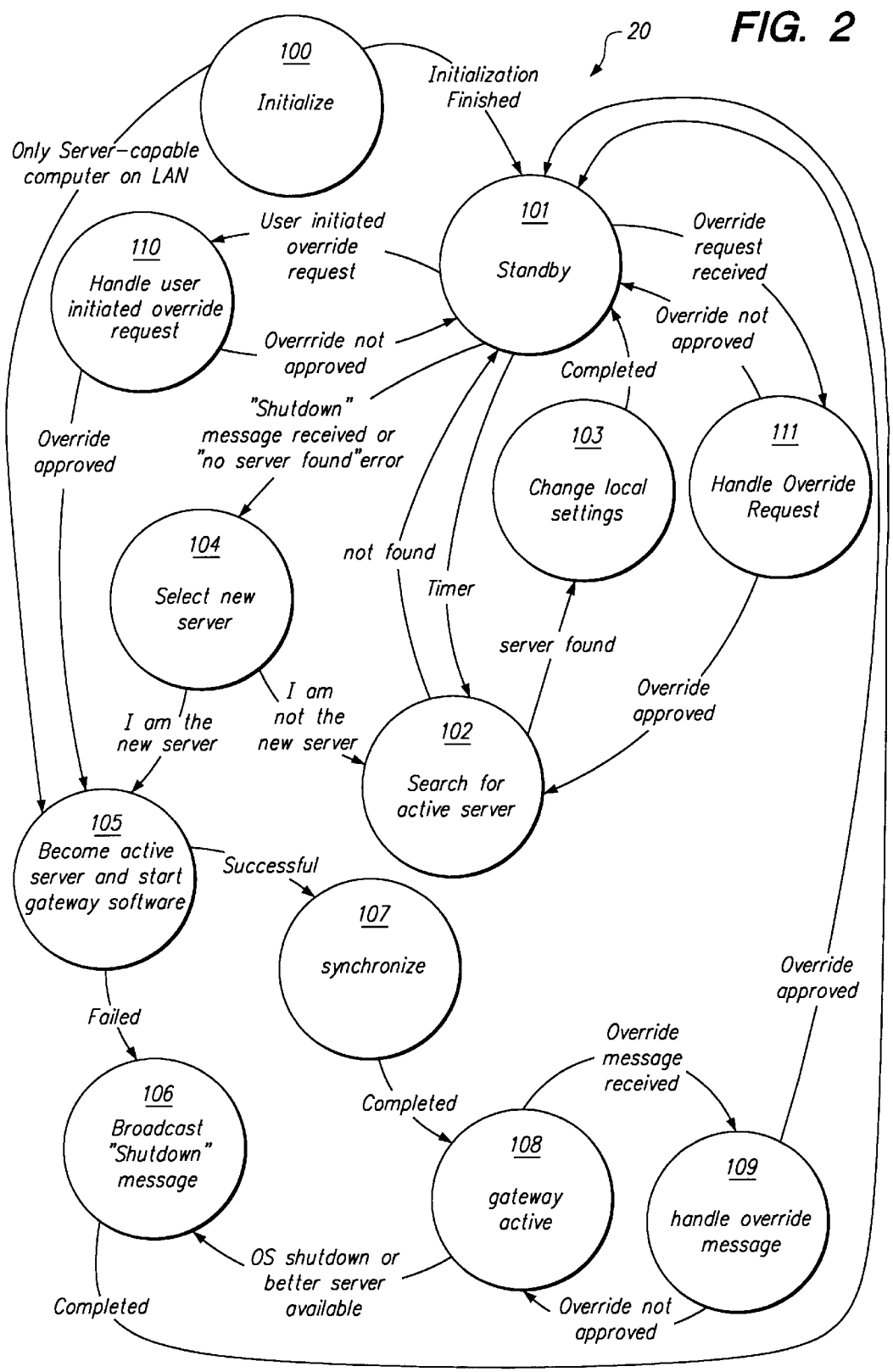
FIG. 2 shows a state diagram of a preferred embodiment of the present invention.

Referring now to FIG. 2, a state diagram of a preferred embodiment of the server selection agent software of the present invention is shown. This software is installed on all of the computers on a LAN, either as a part of their operating systems, or as a separate application, and starts executing on a computer when the computer's operating system is started. Server selection agent software 20 normally executes in the background, and interferes only minimally with other software executing on the computer. A typical computer user may not even be aware that server selection agent software 20 is executing. Optionally, the software may display a small icon on the screen of the computer on which it is executing to provide an indication of the current status of the software. By executing a separate monitoring program, a user may be able to receive more detailed information on the status and functioning of server selection agent software 20.

Execution of server selection agent software 20 starts in state 100. In state 100, a powered-on computer, hereinafter called the "local computer," performs initialization, and establishes its presence on the LAN. This involves steps of broadcasting a initialization message to all other computers on the LAN, the initialization message containing information on the capabilities of the computer, such as the modem speed of the associated modem, and the CPU speed. The local computer then waits a short time to receive messages from all of the other active computers on the LAN detailing the capabilities of those machines.

In a preferred embodiment, the information broadcast during the initialization step includes information on the speed of any modems or other communication devices that the local computer may use to establish a connection to an ISP, and information on the overall system speed of the computer. This information is typically gathered once, when the software is installed. Information on modems or other communications devices may be provided by the user during installation, or may be automatically determined. Information on the overall system speed of the local computer may be determined by executing a benchmark program designed to test how well the computer will perform as a server. This information may be updated whenever significant changes are made to the computer, such as when new hardware is installed.

If the local computer receives no messages from other computers on the LAN, or receives messages only from computers that cannot become a server (e.g. because they do not have a modem), it concludes that there are no other currently active computers capable of becoming a server. In this case, if the local computer is capable of becoming a server, it switches to state 105 and becomes the currently active server. If none of the active computers on the LAN, including the local computer, are capable of becoming a server, an error message is displayed, and the local computer switches to state 101. Under more normal conditions, when the local computer receives information on the capabilities of other currently active computers on the LAN, the local computer switches to state 101.

State 101 is a standby mode, where the software waits for some event, such as a timer message or broadcast message from other computers on the LAN to cause it to transition to a different state. Since state 101 requires little or no processing, and software 20 spends most of its time in state 101, the processing demands placed on a computer by software 20 are minimal.

In state 101, when a timer event occurs, which preferably happens at one minute intervals, the local computer enters state 102, which searches for an active server. If a "Shutdown" message is received, the local computer transitions to state 104, where a new server is selected. The local computer may also transition to state 104 if a "no server found" error occurs, as a result of the local computer repeatedly searching for an active server without finding one. If the user initiates an override request, described in detail hereinafter, the local computer transitions to state 110, to handle the override request. If the local computer receives an override request broadcast in state 101, it transitions to state 111, to determine whether the override request is approved.

State 102 searches the LAN for an active server. This may be achieved by the local computer broadcasting a network message to all computers on the LAN requesting that they respond if they are the active server. If none of the computers responds to the request within a reasonable time (typically less than a second), then no server has been found, and the local computer displays an error message indicating that no active server could be found, and returns to state 101. If another computer responds that it is the active server, the local computer transitions to state 103.

It should be noted that the periodic searching for a server shown in FIG. 2 in the operation of states 101 and 102 could be changed without departing from the invention. For example, the active server could broadcast a message identifying itself at regular intervals, rather than having all of the computers on the LAN search for the server periodically.

In state 103, the local computer adjusts or maintains local software settings to direct network traffic to the proper active server, and returns to state 101.

In state 104, a new server is selected. In a preferred embodiment, this involves the local computer examining the capabilities of all active computers on the LAN, and applying rules to determine which of the computers should become the server. Since all of the computers on the LAN apply the same criteria to determine which of them should become the server, and all of them have the same information on the capabilities of the computers on the LAN, all of the computers will make the same selection.

If it is determined that the local computer should become the server, then the local computer transitions to state 105 and becomes the active server. Otherwise, some other computer on the LAN becomes (or remains) the server, and the local computer transitions to state 102, to search for the active server.

In one embodiment, the rules that determine which of the computers should become the server may be relatively simple. First, to become a server, a computer must have a modem or other communication device with which it can establish a connection to an ISP. If the local computer has no modem, it cannot be the active server. Next, the computer with the fastest modem should become the active server. If the information on capabilities indicates that any of the computers on the network has a faster modem than the local computer, then the local computer should not become the active server. Next, if there was a tie on modem speed, then the computer with the highest overall system speed should become the server. If the information on capabilities indicates that the modem speed of the local computer is the same as at least one other computer on the LAN, and the system speed of the local computer is less than another computer on the LAN having the same modem speed, then the local computer should not become the active server. Finally, in the event that there is a tie on both modem speed and overall system speed, then the computer with the lowest network address is selected as the server.

It will be evident that there are many other rules that could be applied to determine which computer should become the server. The determination could be made, for example, based a weighted sum of the information on the capabilities of each computer on the LAN. Alternatively, other capability information, such as average actual throughput when connected to the ISP could be used as a factor in deciding which computer should become the active server. Additionally, the selection process could be done by a single computer, such as the currently active server, rather than being done simultaneously on all of the active computers on the LAN.

In state 105, the local computer becomes the active server by starting the gateway software. In a preferred embodiment, the gateway software comprises a modified version of a network address translation software package, such as SYGATE, by SyberGen Incorporated, of Fremont, Cali.

Alternatively, the gateway software may comprise proxy server software. Proxy server software is somewhat less preferred, because it is more difficult to configure. If proxy server software is used, then server selection agent software 20 should be modified to act as a local proxy server that runs on every computer on the LAN, and redirects messages to the "actual" proxy server software (i.e. a proxy cascade) running on the selected server, that in turn redirects network traffic to the Internet. This indirect approach avoids the need to reconfigure all of the Internet capable software on the computer every time the server changes.

In one embodiment, the gateway software is modified for use with server selection agent software 20 so that the gateway software and server selection agent software 20 can communicate with each other, and (optionally) so that the gateway software can shut down when an override request is processed, or when the rules indicate that a better server has become available. Alternatively, server selection agent software 20 may use standard operating system services to monitor unmodified gateway software, or to shut the gateway software down when necessary.

If the gateway software fails to start, the local computer transitions to state 106, in which a "Shutdown" message is broadcast. The local computer then transitions back to state 101. If the gateway software starts successfully, the local computer transitions to state 107, which synchronizes network traffic between the new server and the other active computers on the LAN. The local computer then transitions into state 108.

State 108 is a state in which server selection agent software 20 interacts with the gateway software. If a remote or local Internet request is received and the server is not already connected to the ISP, a connection is established. When notice is received that the operating system is shutting down (e.g. because the user is shutting down the computer), the local computer transitions to state 106. If an override request is received, the local computer transitions to state 109.

Additionally, if the local computer is in state 108, and an initialization broadcast is received, the rules described above with respect to state 104 may be applied to determine if the newly initialized computer would be a better server. If so, the local computer may optionally transition to state 106, shutting down as server, and allowing the newly initialized computer to become the active server.

In state 109, the local computer (which is also the active server) handles receipt of an override request. A message is displayed on the screen asking the user of the local computer if he or she approves the override request. If all users of active computers on the LAN agree to the request, then the local computer shuts down the gateway software, stops acting as the server, and transitions back to state 101. If any user on the LAN refuses to allow the override request, or a timeout occurs, then the local computer returns to state 108, and remains the active server.

State 110 handles a user-initiated override request. When the user of the local computer requests that the local computer become the active server, approval is needed from all other active computers on the LAN. State 110 broadcasts an override request message, and waits to hear back from all of the active computers on the LAN, or for a timeout to occur. If all of the other active computers on the LAN approve the override request, then the local computer transitions to state 105 and becomes the active server. Otherwise, the local computer informs the user that the override request was unsuccessful, and returns to state 101.

State 111 handles the receipt of an override request when the local computer is in state 101. A message is displayed on the screen asking the user if he or she approves the override request. If the user approves of the request, the local computer broadcasts approval. If the user disapproves or a timeout occurs, the local computer broadcasts disapproval of the request. If all of the active computers on the LAN send approval, the request has been approved, and the local computer transitions to state 102, to search for the new server. Otherwise, the local computer returns to state 101.

Figure 3:
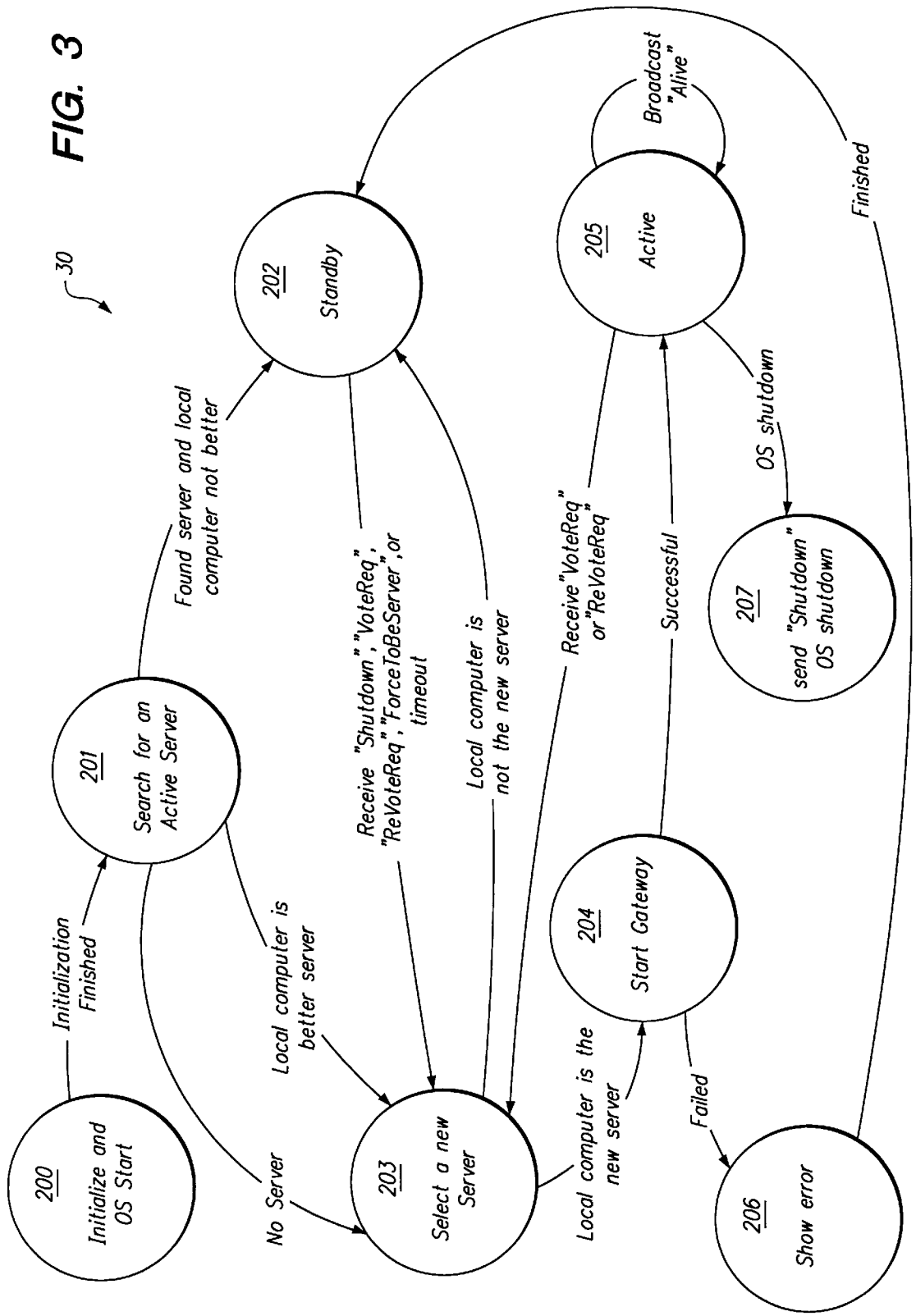
FIG. 3 shows a state diagram of an alternative preferred embodiment of the present invention.

Referring now to FIG. 3, a state diagram of an alternative preferred embodiment of the server selection agent software of the present invention is described. Server selection agent software 30 may be more preferred than server selection agent software 20 of FIG. 2, since it is somewhat simpler, and more robust handling errors. Server selection agent software 30 executes on every computer on a LAN, and may be either a part of the operating systems of the computers on the LAN or may be a separate application. Server selection agent software 30 starts executing in state 200 when the operating system is started.

State 200 is an initialization state, in which server selection agent software 30, executing on a local computer, initializes itself and determines the capabilities of the active computers on the LAN. The information on the capabilities of the active computers on the LAN preferably comprises information on whether each computer has a modem or other communication device with which it can communicate with a wide area network, the speed of any modems or communication devices, and information on the overall system speed. This information may be gathered in a manner similar to that described hereinabove with reference to FIG. 2. When initialization is finished, the local computer transitions to state 201.

In state 201, the local computer searches for an active server. This may be achieved by the local computer broadcasting a network message to all computers on the LAN requesting that they respond if they are the active server. If another computer on the LAN responds that it is the active server, then the local computer applies a set rules to determine if the local computer would be a better server than the current active server. The rules that are used to make this determination, for example, may be identical to the rules described with reference to state 104 of FIG. 2.

If, based upon application of the foregoing rules, it is determined that the local computer would be a better server, then the local computer broadcasts a "VoteReq" message to all of the computers on the LAN, and transitions to state 203. Otherwise, if the rules determine that the local computer is not better than the active server, then the local computer transitions to state 202.

If no computer on the LAN responds that it is the active server, then the local computer transitions to state 203 to choose a server. Additionally, if an error condition occurs, such as if more than one computer responds that it is the active server on a LAN that can have only one active server, state 202 may force all of the systems on the LAN to choose a new server. This is achieved by broadcasting a "ReVoteReq" message to all of the computers on the LAN, and transitioning to state 203.

State 202 is a standby state, in which server selection agent software 30 waits for some event, such as a broadcast message from other computers on the LAN, or a timeout condition, to cause it to transition to a different state. If a "Shutdown" message, a "ReVoteReq" message, a "VoteReq" message, or a "ForceToBeServer" message (described hereinafter) is received while the local computer is in state 202, the local computer transitions to state 203 to select a new server.

Additionally, the local computer expects to receive an "Alive" message from the active server at regular intervals. If such a message is not received for a specified length of time, a timeout condition occurs. A timeout condition typically indicates that the active server is no longer functioning due to some problem, such as if the active server freezes or crashes. When a timeout condition occurs, the local computer transitions to state 203, to select a new server. Optionally, the local computer may also broadcast a "ReVoteReq" message to all the active computers on the LAN, to let all the computers know that a new server should be selected.

It should be noted that the timeout condition of state 202 operates in a very different manner than the timer event described with reference to state 101 of FIG. 2. The timer event causes a kind of "polling" to occur, in which each of the computers searches for the server at regular intervals. Using the timeout event of state 202, the computers do not repeatedly search for a server. Instead, the active server periodically broadcasts "Alive" messages to let the computers on the LAN know that it is still functioning. It will be evident to one skilled in the art that the "polling" mode described with reference to FIG. 2 could be applied to the software shown in FIG. 3, or the timeout mode described with reference to FIG. 3 could be applied to the software shown in FIG. 2.

State 202 also handles user initiation of an override request. If the user of the local computer decides that he or she wants the local computer to become the server, an override request may be initiated from state 202. If the user initiates an override request, the local computer broadcasts a "ForceToBeServer" message, and transitions to state 203.

In state 203, a new server is selected. If the local computer reaches state 203 because there was no active server on the network, due to a timeout, due to an error, or because a "ReVoteReq" message was received, then the local computer applies a set of rules to determine which of the active computers on the LAN should become the server. The rules applied may be identical to the rules described hereinabove with reference to FIG. 2. If the rules determine that the local computer should become the active server, then the local computer transitions to state 204. Otherwise, if the rules determine that the local computer should not become the active server, the local computer transitions to state 202. If no computer on the LAN can become the active server (e.g. because none of the active computers on the LAN has a modem), then an error message is displayed, and the local computer transitions to state 202.

If the local computer reaches state 203 due to a "VoteReq" message, a "Shutdown" message, or a determination that the local computer would be a better server than the active server, then an additional step is required. For a vote to occur in these conditions, the consent of the users of other active computers on the LAN is needed. A message will be displayed on each of the computers on the LAN, requesting the user's consent. If consent is given by all of the computers on the LAN, then the process of selecting a server will proceed, as described hereinabove. If consent is not given, then the active server will remain active, and the other computers on the LAN will return to state 202.

It should be noted that this is a different procedure than is used in the software described with reference to FIG. 2, since permission is needed for the active server to shutdown, or for a computer that is better than the active server to become the active server. In the software described with reference to FIG. 2, no permission from other users is needed to perform these functions. It will be evident to one skilled in the art that a permission scheme similar to the one described with reference to state 203 also could be applied to the software of FIG. 2. Similarly, state 203 could be altered so that these functions are performed without permission of the users of other computers.

State 203 also handles override requests. If the local computer reaches state 203 due to a user initiated override request, or a "ForceToBeServer" message, then consent is needed before the computer that made the request may become the active server. Each of the active computers on the LAN displays a message requesting consent from the user for the override request. If consent is given by the users of all of the active computers on the LAN, then the computer that made the override request becomes the server, by transitioning to state 204, while the other computers on the LAN transition to state 202, and become clients of the new server. Otherwise, if consent is not given by all of the users of active computers on the LAN, then the active server remains active, and all of the other computers on the LAN transition to state 202.

The local computer enters state 204 if it is decided through the server selection process that the local computer should become the active server. In state 204, the gateway software is started. The gateway software preferably comprises modified gateway software, but may also comprise unmodified gateway software, as discussed hereinabove with reference to FIG. 2. If the gateway software starts successfully, the local computer transitions to state 205. Otherwise, if the gateway software fails to start, the local computer transitions to state 206.

State 205 is a state in which server selection agent software 30 interacts with the gateway software. If a remote or local Internet request is received and the server is not already connected to the ISP, a connection is established. When notice is received that the operating system is shutting down (e.g. because the user is shutting down the computer), the local computer transitions to state 207. If a "VoteReq" message or a "ReVoteReq" message is received, then the local computer transitions to state 203. Additionally, the local computer (that is also the active server) periodically broadcasts "Alive" messages to all of the other computers on the LAN, to let the other computers know that the active server is still functioning.

In state 206, an error message is displayed, informing the user of the local computer that the gateway software failed to start. The local computer then transitions to state 202. Optionally, the local computer may remove itself from the set of computers that may become the active server prior to switching to state 202. Additionally, the local computer may optionally broadcast a "ReVoteReq" message, to let the other computers on the LAN know that an error has occurred, and it is necessary to select a new server.

In state 207, the local computer broadcasts a "Shutdown" message, and waits for the Operating system to shut down. It may be necessary for the local computer to refuse to shut down, and to return to state 205 if the users of the other active computers on the LAN refuse to give their consent for the local computer to stop being the active server.

Although preferred illustrative embodiments of the present invention are described above, it will be evident to one skilled in the art that various changes and modifications may be made without departing from the invention. For example, if there are multiple telephone lines, the server selection agent software may be altered to handle more than one active server, and the state that searches for active servers may determine which or the active servers to use based on the load at each active server. Additionally, if there are multiple active servers, each computer may route network traffic through more than one active server to increase network bandwidth.

Additionally, the mechanism for obtaining consent for an override, or for other functions that require consent could be changed so that a simple majority is needed, or so that only the approval of the active server, or of a network administrator is needed. As discussed above, the server selection rules may be altered to change the criteria used to determine which computer is selected as the active server.

It is intended in the appended claims to cover all such changes and modifications that fall within the true spirit and scope of the invention.

What is claimed is:

1. A method of sharing a connection to the Internet among a plurality of computers connected to a local area network, the method comprising:

(a) determining that a subset of the plurality of computers are available for use as a server;

(b) automatically selecting one of the subset of the plurality of computers to become the server;

(c) repeating steps (a) and (b) when the server becomes unavailable;

(d) establishing a connection between the server and the Internet; and (e) routing Internet traffic through the server to the Internet.

2. The method of claim 1, wherein routing Internet traffic through the server to the Internet comprises a step of running gateway software on the server.

3. The method of claim 2, wherein the gateway software comprises network address translation software.

4. The method of claim 2, wherein the gateway software comprises proxy server software.

5. The method of claim 1, wherein determining that a subset of the plurality of computers are available for use as a server further comprises gathering information on selected capabilities of active ones of the plurality of computers.

6. The method of claim 5, wherein automatically selecting one of the subset of the plurality of computers to become the server comprises evaluating a set of rules to determine which of the subset should become the server.

7. The method of claim 6, wherein evaluating the set of rules comprises evaluating the information on selected capabilities of active ones of the plurality of computers.

8. The method of claim 7, wherein the selected capabilities include a communication speed of each of the active ones of the plurality of computers, and evaluating the set of rules comprises evaluating the communication speed.

9. The method of claim 7, wherein the selected capabilities include a system speed of each of the active ones of the plurality of computers, and evaluating the set of rules comprises evaluating the system speed.

10. The method of claim 6, wherein the method further comprises reevaluating the set of rules when an additional computer becomes active.

11. The method of claim 1, wherein determining that a subset of the plurality of computers are available for use as a server further comprises determining which of the plurality of computers are powered on.

12. The method of claim 1, wherein determining that a subset of the plurality of computers are available for use as a server further comprises determining which of the plurality of computers has access to a communication device capable of establishing a connection to the Internet.

13. The method of claim 1, wherein the method further comprises permitting a user of one of the subset of the plurality of computers to override automatic selection of the server.

14. The method of claim 13, wherein permitting a user to override automatic selection of the server further comprises overriding automatic selection of the server only if the users of all of the subset of the plurality of computers consent.

15. Apparatus for selecting a computer on a local area network to become a server to permit sharing of an Internet connection among a plurality of computers connected to a local area network, the apparatus comprising a local computer connected to the local area network, the local computer programmed to:

(a) determine that a subset of the plurality of computers are available for use as a server;

(b) automatically select one of the subset of the plurality of computers to become the server;

(c) repeat steps (a) and (b) when the server becomes unavailable;

(d) establish a connection between the local computer and the Internet, and become the server, if the local computer was selected to become the server; and (e) route Internet traffic through the server to the Internet.

16. The apparatus of claim 15, wherein the local computer is further programmed to inform other active ones of the plurality of computers that the server is unavailable if the local computer is the server, and the local computer is becoming unavailable.

17. The apparatus of claim 15, wherein the local computer is further programmed to execute gateway software to route Internet traffic to the Internet, if the local computer is the server.

18. The apparatus of claim 17, wherein the gateway software comprises network address translation software.

19. The apparatus of claim 17, wherein the gateway software comprises proxy server software.

20. The apparatus of claim 17, wherein the local computer is further programmed to gather information on selected capabilities of active ones of the plurality of computers.

21. The apparatus of claim 20, wherein the local computer is programmed to automatically select one of the subset of the plurality of computers to become the server by evaluating a set of rules to determine which of the subset should become the server.

22. The apparatus of claim 21, wherein evaluating the rules comprises evaluating the information on selected capabilities of the active ones of the plurality of computers.

23. The apparatus of claim 22, wherein the selected capabilities include a communication speed of each of the active ones of the plurality of computers, and the evaluating the set of rules comprises evaluating the communication speed.

24. The apparatus of claim 22, wherein the selected capabilities include a system speed of each of the active ones of the plurality of computers, and evaluating the set of rules comprises evaluating the system speed.

25. The apparatus of claim 21, wherein the local computer is further programmed to reevaluate the set of rules when an additional computer becomes active.

26. The apparatus of claim 15, wherein the local computer is programmed to determine that a subset of the plurality of computers are available for use as a server by determining which of the plurality of computers are powered on and have access to a communication device capable of establishing a connection to the Internet.

27. The apparatus of claim 21, wherein the local computer is further programmed to permit a user of one of the subset of the plurality of computers to override automatic selection of the server.

28. The apparatus of claim 27, wherein the local computer is programmed to permit a user to override automatic selection of the server only if the users of all of the subset of the plurality of computers consent.

29. Apparatus for sharing an Internet connection among a plurality of computers, the apparatus comprising:

a local area network interconnecting the plurality of computers; and a communication line permitting a connection between at least one of the plurality of computers and the Internet;

wherein each one of the plurality of computers comprises a processor programmed to:

(a) determine that a subset of the plurality of computers are available for use as a server;

(b) automatically select one of the subset of the plurality of computers to become the server;

(c) repeat steps (a) and (b) when the server becomes unavailable;

(d) establish a connection between the computer and the Internet, and become the server, if the computer was selected to become the server; and (e) route network traffic through the server to the Internet.

30. The apparatus of claim 29, wherein the local area network comprises a network hub, and each of the plurality of computers is connected to the local area network through the network hub.

31. The apparatus of claim 29, wherein at least one of the plurality of computers comprises a communication device coupled to the communication line.

32. The apparatus of claim 31, wherein the communication device comprises a modem, and the communication line comprises a public telephone line.

33. The apparatus of claim 31, wherein the communication device comprises a cable modem, and the communication line comprises a cable line.

34. The apparatus of claim 31, wherein the communication device comprises a digital subscriber line modem, and the communication line comprises a digital subscriber line.

35. The apparatus of claim 31, wherein the communication device comprises an ISDN modem, and the communication line comprises an ISDN line.

36. The apparatus of claim 29, wherein the server executes gateway software to route network traffic to the Internet.

37. The apparatus of claim 36, wherein the gateway software comprises network address translation software.

38. The apparatus of claim 28, wherein the gateway software comprises proxy server software.

39. The apparatus of claim 29, where the local area network comprises network connections chosen from a set consisting of 10Base-T, 100Base-T, telephone lines, power lines, wireless infrared communications, and wireless RF communications.

* * * * *